July 8, 1952 J. T. SERDUKE ET AL 2,602,632

HIGH-SPEED BEARING AND TURBINE

Filed Jan. 20, 1950

WITNESSES:
Ralph Cable Smith
Gene C. Newlin

INVENTORS:
James T. Serduke
Robert O. Webster
BY
Roland A. Anderson
Attorney

Patented July 8, 1952

2,602,632

UNITED STATES PATENT OFFICE 2,602,632

HIGH-SPEED BEARING AND TURBINE

James T. Serduke, El Cerrito, Calif., and Robert O. Webster, Los Alamos, N. Mex., assignors to the United States of America as represented by the United States Atomic Energy Commission Application January 20, 1950, Serial No. 139,585

4 Claims. (Cl. 253—39)

This invention is directed to an improved high-speed rotary air bearing turbine. More particularly, it relates to a turbine having a short, hollow shaft capable of performing in any orientation at angular velocities up to 100,000 revolutions per minute.

High-speed rotary devices necessitate the use of bearings of excellent anti-friction characteristics. Mechanical bearings are deficient in that they are the source of considerable noise and, in addition, limit attainable speed due to friction. Of the available mechanical bearings, the ball bearing has the least friction but suffers from difficulties in lubrication at ultra high speeds. The reason for this is that ultra high rotary speeds produce centrifugal forces of such magnitude as to cause high bearing pressures which eject the lubricant from the bearing.

A solution for eliminating mechanical bearings with their attendant deleterious effects is disclosed in the prior art by Patent No. 1,906,715 to Penick in which an air film is utilized in the bearing between the rotating and stationary parts of a machine. However, the prior art is directed to improving bearings in machines in which the rotating part is supported in a plurality of cylinders and does not teach how a short rotor can be supported in a stator for operation in any selected orientation.

It is a necessity if a rotor is to be supported by an air film while operating in any orientation that provision be made for establishing air pressure between the rotor and its stator in both radial and axial directions. To this end, the rotor of the present invention has a cylindrical intermediate portion and outwardly flared ends. The stator has a corresponding inner cylinder and outwardly flared ends. This inner cylinder is perforated with air jets in both the cylindrical portion and the flared ends so that some air jets are directed radially and some are directed with an axial component against the rotor intermediate portions and flared ends respectively. For propulsion purposes, a plurality of air jets inclined in a tangential direction are provided through the inner cylinder to permit inclined air streams to impinge against the rotor.

It is therefore an object of the present invention to provide an air bearing capable of operation in any orientation.

Another object of this invention is the provision of a short hollow shaft turbine, the rotor of which is both supported and driven by air.

Other objects and advantages of the present invention will be apparent from the following specification taken in connection with the drawings made a part hereof and in the description of a presently preferred embodiment.

Figure 1:
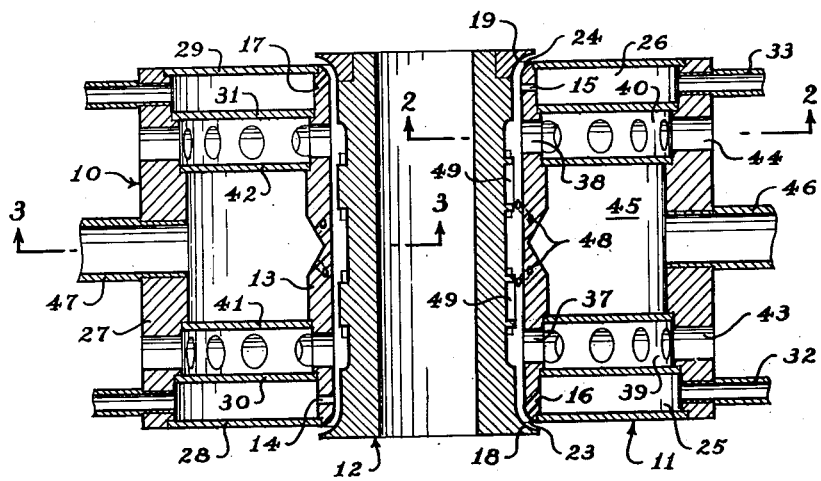
Figure 1 is a cross-sectional view in plan of the device in accordance with the present invention.

Referring to Figure 1, a turbine assembly is indicated generally by the numeral 10 and is shown to comprise a stator 11 and a rotor 12. The stator includes an inner cylinder 13 which surrounds the rotor and is separated therefrom by a small clearance.

The rotor is supported in spatial relationship within the stator by the radial impingement thereagainst of air injected through radial jets 14 and 15. The jets are several in number and are equally spaced along a circumference at each end of the inner cylinder.

Endwise centering of the rotor is accomplished by the interaction of the series of circumferentially-spaced inclined air jets 16 and 17 with outwardly flared ends 18 and 19 on the rotor and similarly contoured portions 23 and 24 on the stator.

The rotor is arranged for assembly in the stator by removably securing rotor flared end 19 to the rotor 12.

The radial and inclined air jets are supplied with compressed air from air bearing pressure chambers 25 and 26 formed by enveloping cylinder 27, end walls 28 and 29, and septums 30 and 31 and inner cylinder 13. Air under compression is inducted into air bearing pressure chamber 25 by duct 32 and into air bearing pressure chamber 26 by duct 33. The compressed air impinges from radial jets 14 and 15 radially against the rotor and with an axially outward component of force against the flared ends of the rotor from axial jets 16 and 17. The radially directed air after impinging against the rotor divides and flows into the flared passage between the rotor ends and stator and through ports 37 and 38 into exhaust chambers 39 and 40 formed by septums 30 and 41 and septums 31 and 42. Exhaust chambers 39 and 40 are provided with outlet ports 43 and 44.

The compressed air, which is moving through the flared passageway between the rotor ends and stator, supports and centers the rotor axially. Radial support of the rotor is accomplished by radial force of compressed air impinging on its outer surface from radial jets 14 and 15. The rotor support is enhanced by the axial force of compressed air emitted from axial jets 16 and 17 against the rotor flared ends 18 and 19. It follows that the balanced radial and axial forces against the rotor maintains its floating relation with respect to the stator regardless of orientation.

For driving the rotor 12, compressed air enters pressure chamber 45 through ducts 46 and 47 and is emitted through propulsion jets 48 to impinge on concave buckets or pockets 49 circumferentially spaced about the rotor. The propulsion jets 48 are tangent to one end of the arc of the buckets and diverge angularly toward the buckets.

Figures 2, 3:
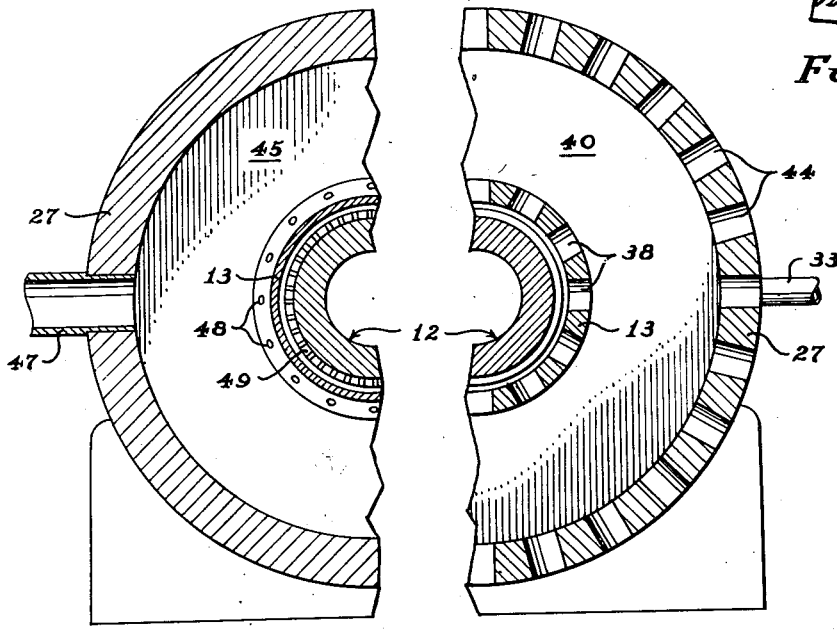
Figure 2 is a cross-sectional view in elevation taken on the line 2—2 of Figure 1.
Figure 3 shows a cross-sectional view in elevation taken on the line 3—3 of Figure 1.

Figure 2 illustrates in detail how the device is constructed to permit air at reduced pressure to exhaust from the space between the inner cylinder 13 and rotor 12 through ports 38, exhaust chamber 40 and outlet ports 44.

Figure 3 shows diagrammatically how the apparatus is constructed to permit air to travel from a source of pressure to the radial buckets 49 through ducts 46 and 47, pressure chamber 45 and propulsion jets 48.

Figure 4:
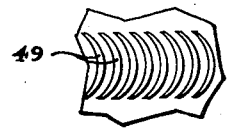
Figure 4 shows a developed surface of the cylindrical rotor showing radial propulsion buckets.

Figure 4 shows in detail the construction of the radial buckets 49, convexed in the direction of rotation of the rotor.

In operation, compressed air is first admitted through ducts 32 and 33 where it passes into air bearing pressure chambers 25 and 26 and through radial and axial jets 14, 15, 16 and 17 to position the rotor for operation with an air bearing stratum between it and the inner cylinder 13. The air used for the air bearings is exhausted through exhaust chambers 39 and 40 and through the space between the contoured ends 23 and 24 of the inner cylinder 13 and the flared ends 18 and 19 of the rotor. Compressed air for propelling the rotor is then admitted through ducts 46 and 47 into pressure chamber 45 and then through propulsion jets 48 to impinge on radial buckets 49 and is exhausted at reduced pressure through exhaust chambers 39 and 40 and exhaust ports 43 and 44.

It should be noted that the air bearings between the rotor and inner cylinder avoid the need for lubrication and completely eliminate the problem of mechanical friction between the bearing surfaces. Because of the circumferential arrangement of the axial and radial jets the uniform force of compressed air on the rotor maintains it in an operating position in any orientation of the turbine.

The operation of the above described invention is not restricted to the use of air but may employ the use of any gas to accomplish the desired result. Further, it is noted that by the use of air or a gas no lubrication or cooling media is required.

It will thus be apparent to those skilled in the art that this invention is not necessarily limited to the particular embodiment shown and described but that many modifications may be made without departing from the scope of this invention as set forth in the appended claims.

What is claimed is:

1. A stator-rotor assembly for ultra high angular speeds of the rotor; the stator having an internal cylindrical surface with outwardly flaring end surfaces, the rotor being slightly smaller in diameter than said stator cylinder and having short outwardly flaring end abutments adjacent to the cylinder flaring end surfaces, means for impinging streams of gas of like force perpendicularly to the axis of the rotor against the rotor at intervals around its circumference in a radial direction to support said rotor centrally of said stator cylindrical surface and means for directing streams of gas of like force through the stator flared end surfaces outwardly at an acute angle to the axis of the rotor to support said rotor flared end surfaces in spaced relation to the stator flared end surfaces in any orientation of said assembly.

2. In the high speed assembly recited in claim 1, said rotor having at least one set of circumferentially-spaced concave arc-shaped pockets thereon and at least one set of circumferentially-spaced propulsion jets in the stator aligned to deliver streams of gas into said pockets tangentially into one end of their concave arc, whereby said rotor is both driven and supported by said propulsion and bearing streams of gas.

3. A stator-rotor assembly for ultra high angular speeds of the rotor; the stator having an internal cylindrical surface with outwardly flaring end surfaces, the rotor being slightly smaller in diameter than said stator cylinder and having outwardly flaring ends adjacent the cylinder flaring surfaces, the flared surfaces being substantially a one quadrant arc of short radius compared to the rotor radius, the diameter of the rotor flared ends only slightly exceeding the diameter of the stator internal cylindrical surface, means for impinging streams of gas of like force perpendicularly to the axis of the rotor against the rotor at intervals around its circumference in a radial direction to support said rotor centrally of said stator cylindrical surface, and means for directing streams of gas through the stator flared end surfaces outwardly at an acute angle to the axis of the rotor to support said rotor flared end surfaces in spaced relation to the stator flared end surfaces in any orientation of said assembly.

4. A high speed gas-driven turbine with gas bearings, comprising a stator having an inner surface cylindrical in cross section with outwardly flared ends, a large annular gas bearing inlet chamber in each end of said stator, at least one set of circumferentially-spaced radial and angular bearing jets leading from each of said chambers to the periphery of said cylinder, a centrally located propulsion inlet chamber in said stator, at least one set of centrally located circumferentially-spaced propulsion jets leading from said propulsion chamber to the periphery of said cylinder, an exhaust chamber adjacent each side of said propulsion chamber in communication with said inner cylinder for exhausting gas at reduced pressure from said cylinder, a rotor movable in said cylinder having an annular flaring thrust flange of slightly larger diameter than said cylinder positioned outside of and adjacent to the outwardly flared ends of the stator, said rotor having at least one set of centrally located circumferentially-spaced arcuate pockets thereon, said propulsion jets being aligned to deliver streams of gas into said pockets tangential to their concave arc for driving said rotor, said radial and angular bearing jets aligned to deliver streams of gas of like force at high pressure perpendicularly against the periphery of said rotor both radially and outwardly against the flared surface of said flanges, whereby said rotor is supported both radially and axially in any orientation by said bearing jets.

JAMES T. SERDUKE.
ROBERT O. WEBSTER.

REFERENCES CITED

The following references are of record in the file of this patent:

UNITED STATES PATENTS

| Number | Name | Date |
|---|---|---|
| 845,334 | Cooper | Feb. 26, 1907 |
| 894,927 | Westinghouse | Aug. 4, 1908 |
| 1,906,715 | Penick | May 2, 1933 |
| 2,086,898 | Carter | July 13, 1937 |

FOREIGN PATENTS

| Number | Country | Date |
|---|---|---|
| 2,815 | Great Britain | of 1900 |